United States Patent [19]
Defontenay

[11] 3,726,459
[45] Apr. 10, 1973

[54] APPARATUS FOR PRODUCING INTERMITTENT MOTION

[75] Inventor: Paul Defontenay, Gourg la Reine, France

[73] Assignee: Redex Societe Anonyme, Ivry (Seine), France

[22] Filed: Jan. 21, 1972

[21] Appl. No.: 219,871

Related U.S. Application Data

[62] Division of Ser. No. 861,809, Sept. 29, 1969.

[52] U.S. Cl. .................................. 226/152, 226/188
[51] Int. Cl. .......................................... B65h 17/22
[58] Field of Search ..................... 226/152, 156, 187, 226/188; 74/84, 394, 393

[56] References Cited

UNITED STATES PATENTS

| 3,053,129 | 9/1962 | Aronson et al. | 226/152 X |
| 3,076,351 | 2/1963 | Moss | 74/394 |
| 3,586,224 | 6/1971 | Adams | 226/152 |

*Primary Examiner*—Allen N. Knowles
*Attorney*—Shapiro and Shapiro

[57] ABSTRACT

Intermittent movement of a work piece is produced from a rotary motor which drives the case of a differential. A cam integral with the differential case drives a gear rack slider having a pinion which drives one sun gear of the differential. Another sun gear of the differential is coupled to the first sun gear by planet gears. Output drive rollers are gear driven from the shaft of the second sun gear. A switch actuated by the slider may be employed to control an external machine or to control the operation of the motion producer itself.

2 Claims, 5 Drawing Figures

APPARATUS FOR PRODUCING INTERMITTENT MOTION

This is a division of application Ser. No. 861,809, filed Sept. 29, 1969, now U.S. Pat. No. 3,656,363.

BACKGROUND OF THE INVENTION

This invention relates to apparatus for producing intermittent or discontinuous motion and is more particularly concerned with driving a work piece intermittently from a rotary motor.

Cyclically operated machines, such as punching or forging presses, may require that a work piece, such as a wire or metallic ribbon, be formed or fed discontinuously. Various types of mechanical, electrical, hydraulic, or pneumatic mechanisms, or combinations thereof, have heretofore been proposed for producing such motion.

BRIEF DESCRIPTION OF THE INVENTION

It is a principal object of the present invention to provide an improved, simple and highly versatile mechanical apparatus for producing intermittent or periodic motion.

Briefly stated, in a preferred embodiment the apparatus of the invention comprises a differential, the case of which may be continuously rotated by a motor. A cam fixed to the case drives a slider having a gear rack which drives a pinion fixed to a first sun gear of the differential. A second sun gear of the differential is driven from the first by planet gears, and the shaft of the second sun gear drives output rollers through output gearing.

BRIEF DESCRIPTION OF THE DRAWINGS

The invention will be further described in conjunction with the accompanying drawings, which illustrate a preferred and exemplary embodiment, and wherein.

DETAILED DESCRIPTION OF THE INVENTION

Figure 2:
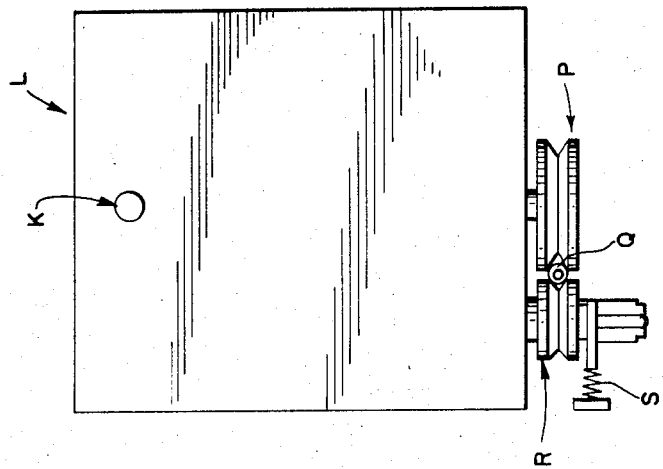
FIG. 2 is an end view of the apparatus as seen in the direction of arrows 2—2 of FIG. 1.
Figure 1:
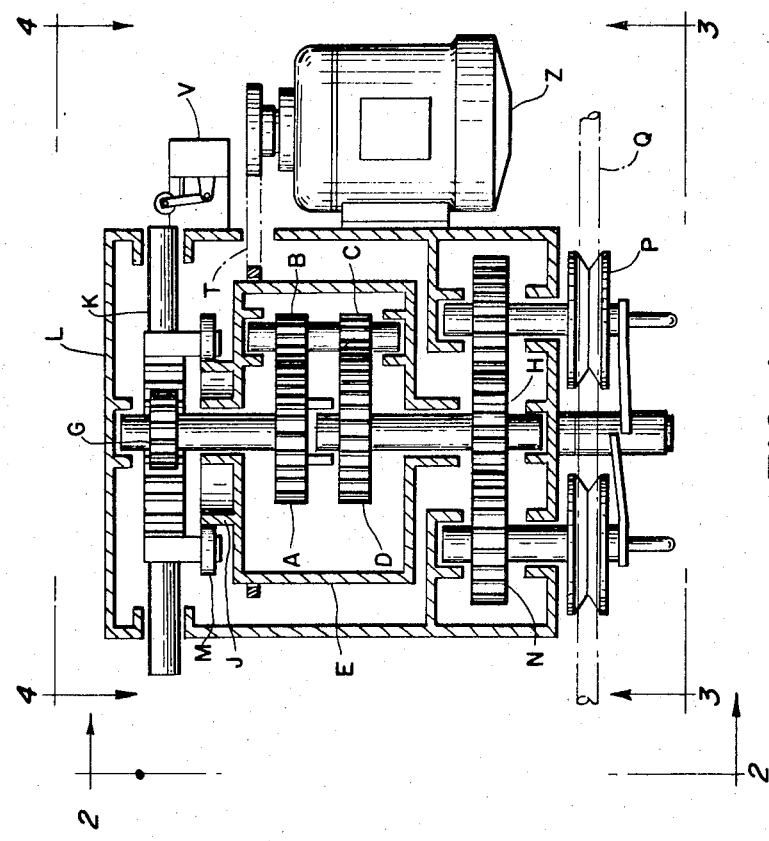
FIG. 1 illustrates in horizontal section the apparatus of the invention as viewed in the direction of the arrows at line 1—1 of FIG. 3.
Figure 3:
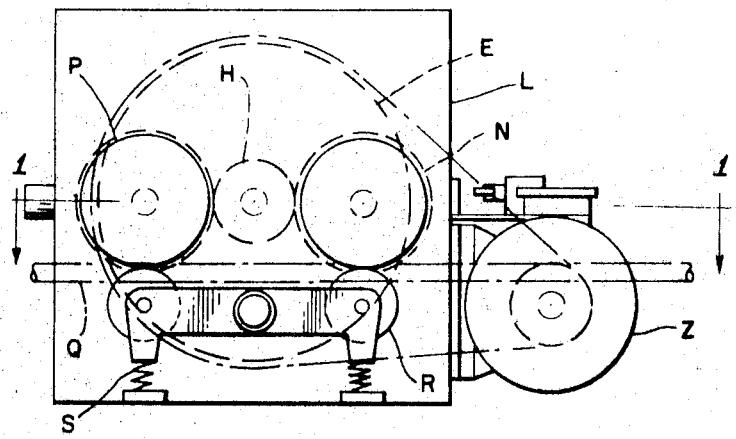
FIG. 3 is a side elevation view as seen in the direction of arrows 3—3 of FIG. 1.
Figure 4:
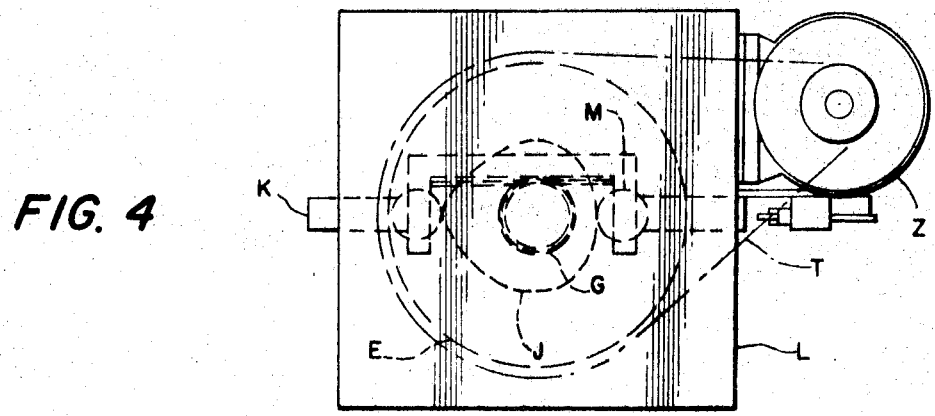
FIG. 4 is a side elevation view as seen in the direction of arrows 4—4 of FIG. 1.

Referring to the drawings, the apparatus employed in the invention may comprise a rotary motor Z, such as a conventional electric motor mounted on frame L, the shaft of the motor constituting the input shaft of the apparatus and driving the casing or housing E of a differential by means of a transmission T, such as belt and pulley drive. A cam J (see FIGS. 1 and 4) is fixed to the case of the differential and engages a cam-follower or slider K having rollers M which engage diametrically opposite sides of the cam J. The slider reciprocates upon the frame L and also has a gear rack which drives a pinion gear G fixed to the same shaft as a first sun gear A of the differential. The first sun gear drives a second sun gear D through planet gears B and C fixed to a common shaft and rotatable in the differential casing E. An output gear H is fixed to the same shaft as sun gear D and drives a pair of gears N fixed to shafts rotatable in the fame L and carrying output rollers P.

Rollers P may be V-grooved for driving a work piece Q, such as a wire of circular cross-section. Other types of work pieces, such as groups of wires or a sheet or ribbon, may be driven by suitable output rollers. Rollers P mate with idler rollers R supported upon brackets having one end biased by springs S toward rollers P and the other end pivotally connected to the frame L. A switch V may be operated by slider K for control of another machine. The switch may also be employed to make the operation of the device of the invention dependent upon another machine.

The rotational speeds of certain parts may be defined as follows:

$U$ = rotation speed of housing E $\omega_n$ = rotation speed of gears D and H and jointly of rollers P $\omega_i$ = rotation speed of gears A and G The gear ratio of the differential may be defined as follows:

$$\rho = (A \times C)/(B \times D)$$

where, in this instance, A, B, C, and D represent the number of teeth of the designated gears.

The kinematic relationships between the speeds $U$, $\omega_n$, $\omega_i$ are interdependent and are defined by the well known known Willis law as follows:

$$\omega_n = \rho\omega_i + U(1-\rho)\omega_i = \frac{\omega_n - U(1-\rho)}{\rho} \quad U = \frac{\omega_n - \rho\omega_i}{1-\rho}$$

Control of the rotation speed $\omega_i$ is determined by cam J (which turns with housing E) through the slider K and gear G. By virtue of the operation of the cam, gear G may have positive rotation, negative rotation, or no movement at all, depending upon the cam configuration. Since gear G is connected to gear H by means of the differential, it is apparent that the motion of output rollers P may be a succession of rotations and stops, consequently an intermittent motion. Rollers P may increase their speed progressively, then rotate uniformly, and then slow down until they stop, imparting an intermittent translational motion to wire Q. Sliding of the wire relative to the drive rollers is prevented by the push-rollers R.

Figure 5:
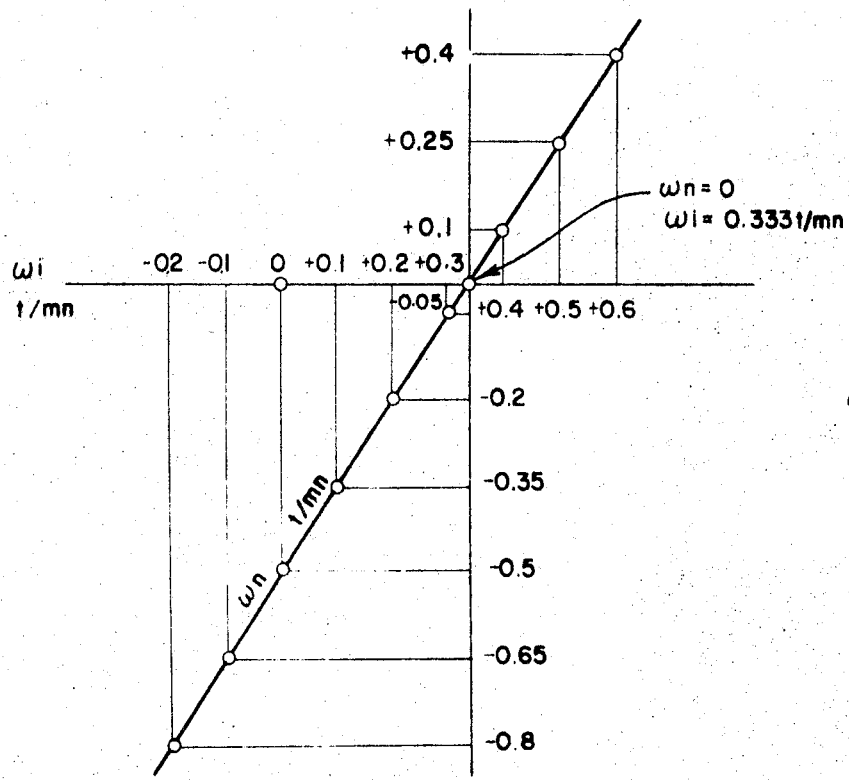
FIG. 5 is a diagram illustrating the motion produced by apparatus of the invention.

If, for example, $U = 1$ r.p.m. and $\rho = 1.5$, the diagram of FIG. 5, which shows the variation of the speed of rotation $\omega_n$ with $\omega_i$, is defined in accordance with the formulas given above. Thus, if cam J, during the first part of its rotation in one revolution, makes $\omega_i$ (through G) +0.333 r.p.m. $\omega_n$ will be zero. Then, if during the second part of the cam rotation, that is, for the remainder of the first revolution of the cam, $\omega_i$ is −0.2 r.p.m. $\omega_n$ will be −0.8 r.p.m.

While a preferred embodiment of the invention has been shown and described, it will be apparent to those skilled in the art that changes can be made without departing from the principles and spirit of the invention.

The invention claimed is:

1. Apparatus for driving a work piece intermittently, comprising a cam, means for rotating said cam, cam-follower means driven by said cam, an output shaft, and a gear train coupling said cam-follower means to said output shaft, said gear train comprising a differential having a housing, said means for rotating said cam comprising the housing of said differential, said differential having a pair of sun gears, said cam-follower means having a gear rock reciprocated by said cam, said gear train including a pinion driven by said rack and driving a first of said sun gears, the second sun gear driving said output shaft, said output shaft having means for driving a work piece reciprocatively.

2. Apparatus for driving a work piece intermittently, comprising a cam, means for rotting said cam, follower means driven by said cam, a pair of output shafts, and a gear train coupling said cam-follower means to said output shafts, said gear train comprising a differential having a housing, said means for rotating said cam comprising the housing of said differential, said differential having a pair of sun gears, said cam-follower means having a gear rack reciprocated by said cam, said gear train including a pinion driven by said rack and driving a first of said sun gears, said output shafts being driven in parallel from the second sun gear, each of said output shafts having a drive roller thereon, and a pair of idler rollers resiliently biased toward said drive rollers, whereby a work piece may be reciprocatively driven between said drive rollers and said idler rollers.

* * * * *